Figure 1:
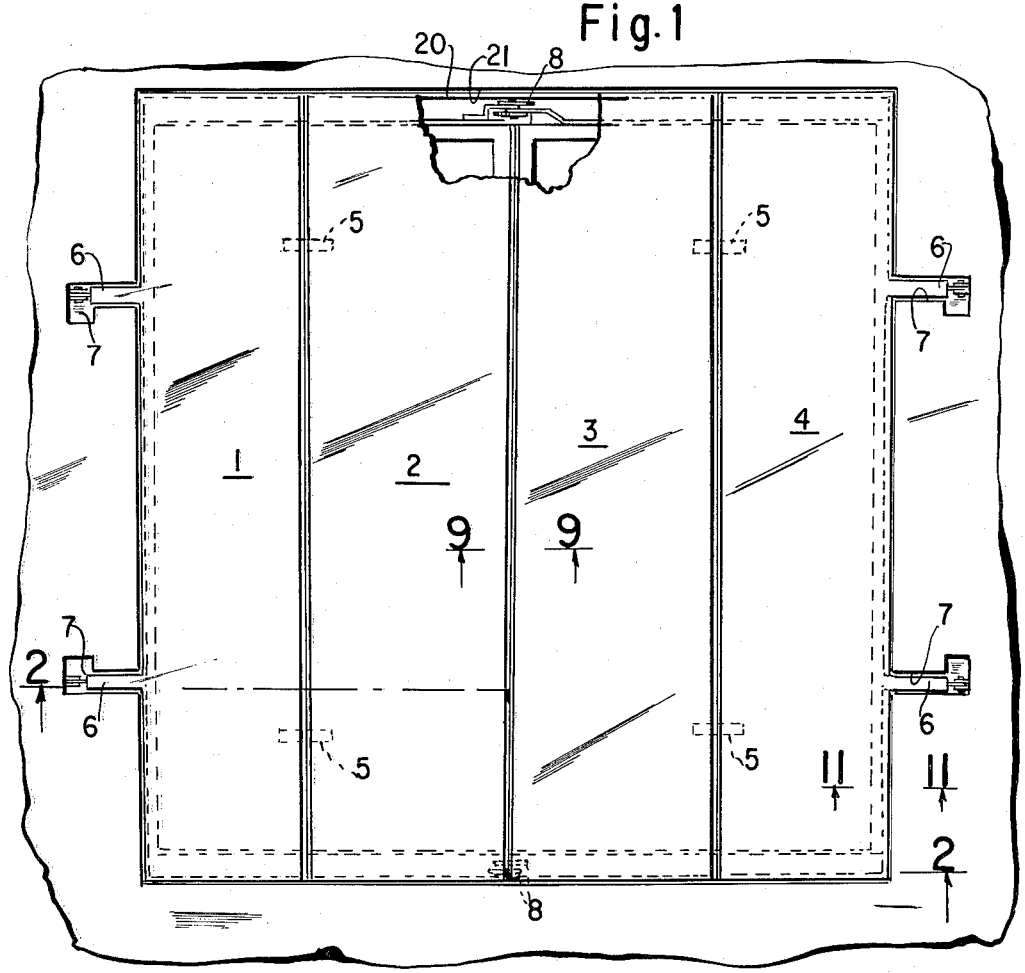

INVENTOR
GUSTAVE STRANSKY
BY
ATTORNEYS

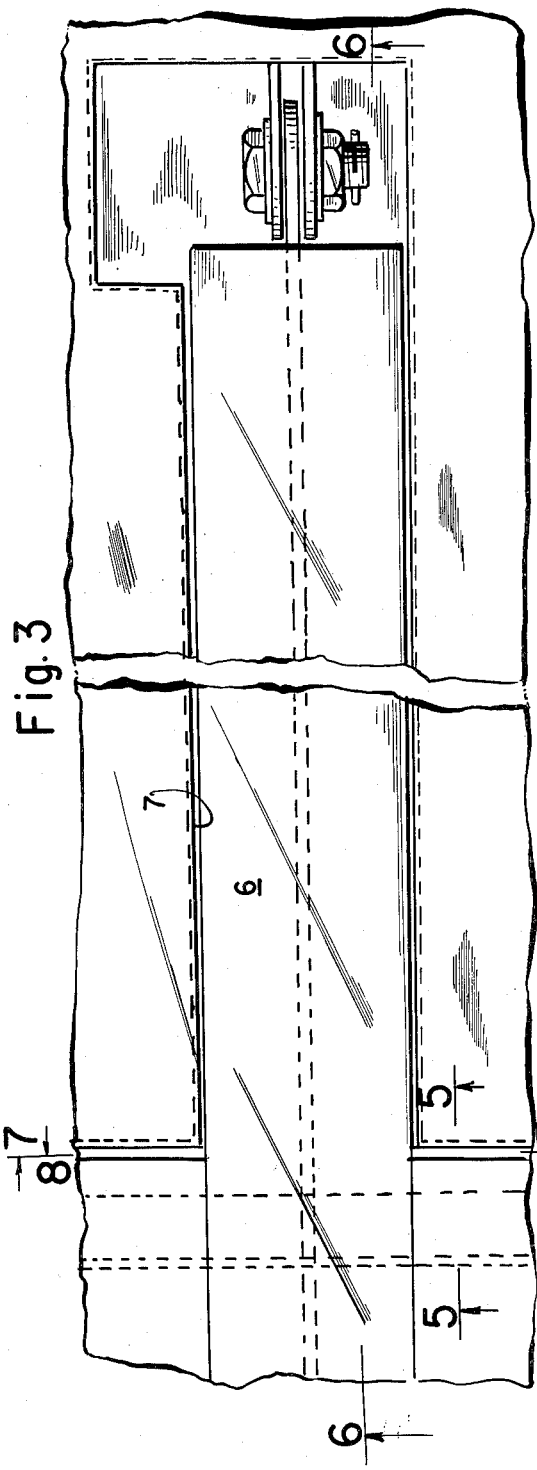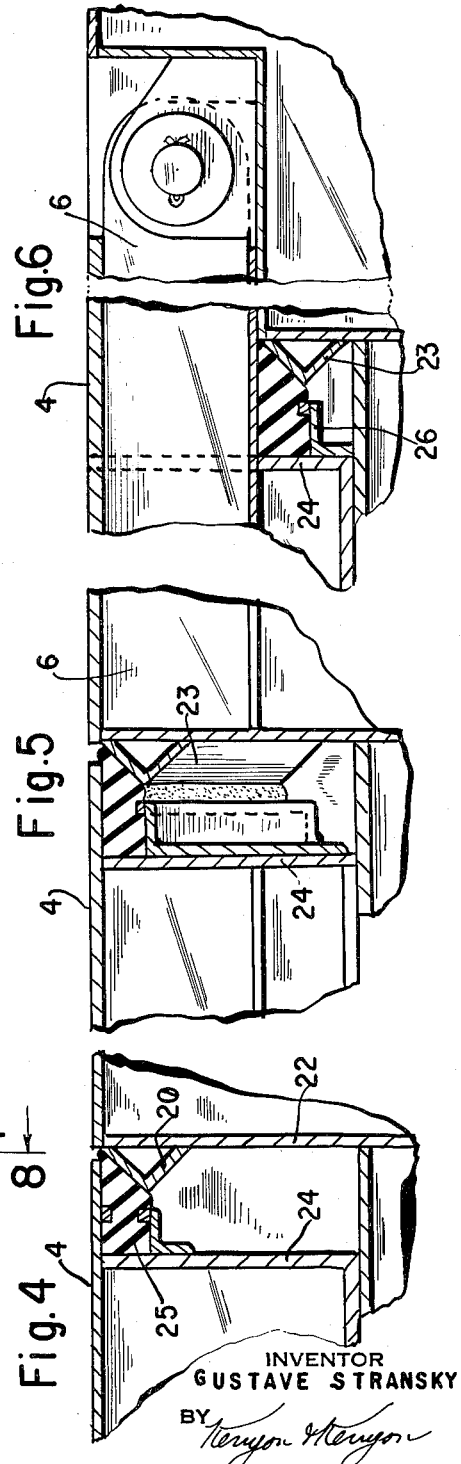

July 24, 1962 G. STRANSKY 3,045,631
WATER-TIGHT FLUSH HATCH COVER CONSTRUCTIONS
Filed Dec. 14, 1959 6 Sheets-Sheet 3

INVENTOR
GUSTAVE STRANSKY
BY
ATTORNEYS

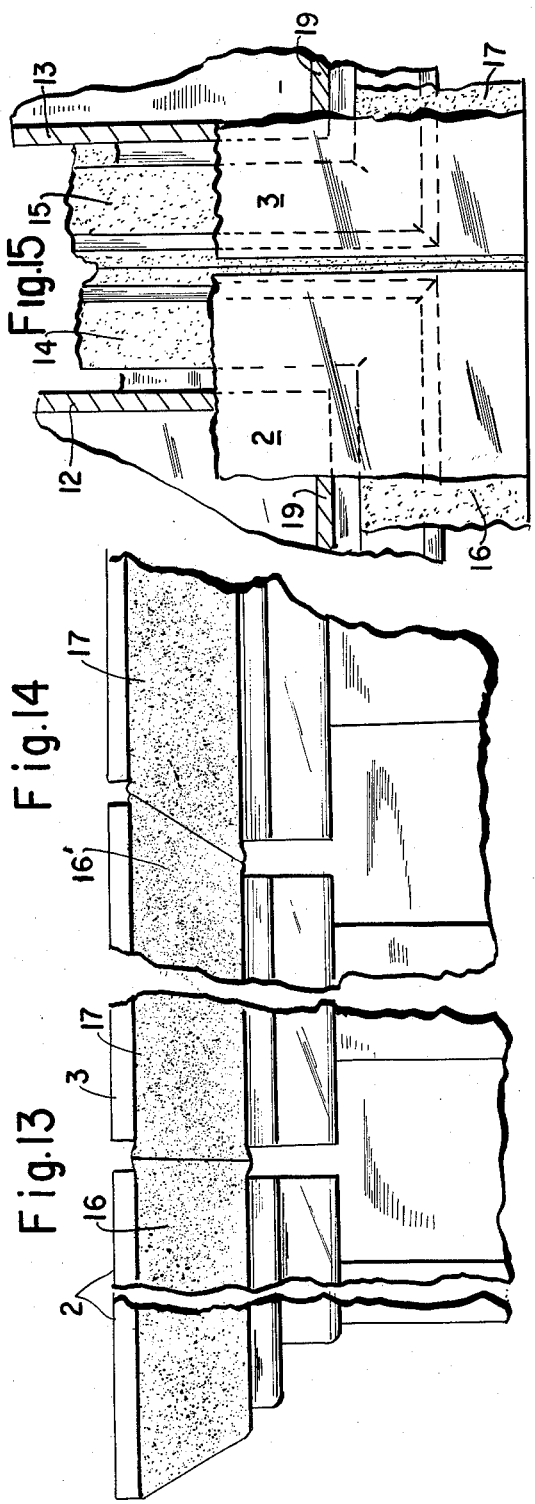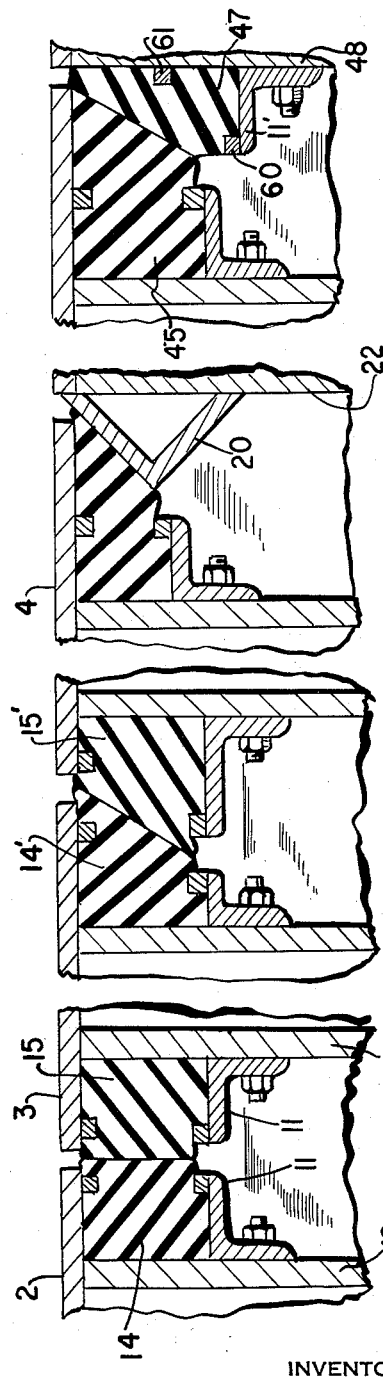

July 24, 1962 G. STRANSKY 3,045,631
WATER-TIGHT FLUSH HATCH COVER CONSTRUCTIONS
Filed Dec. 14, 1959 6 Sheets-Sheet 5
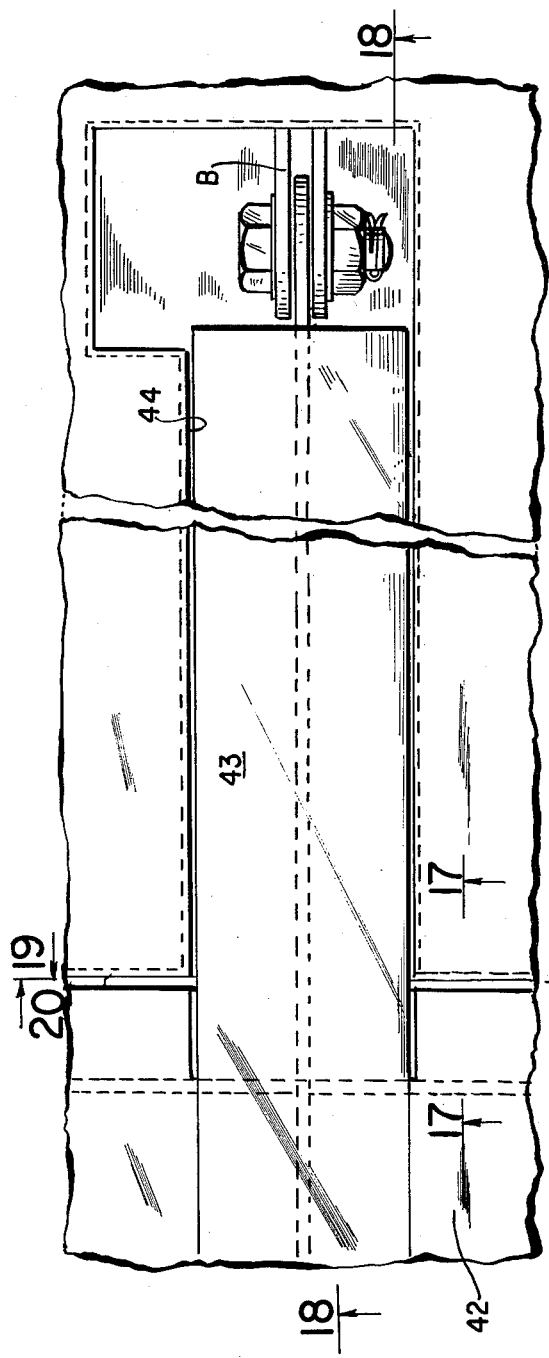
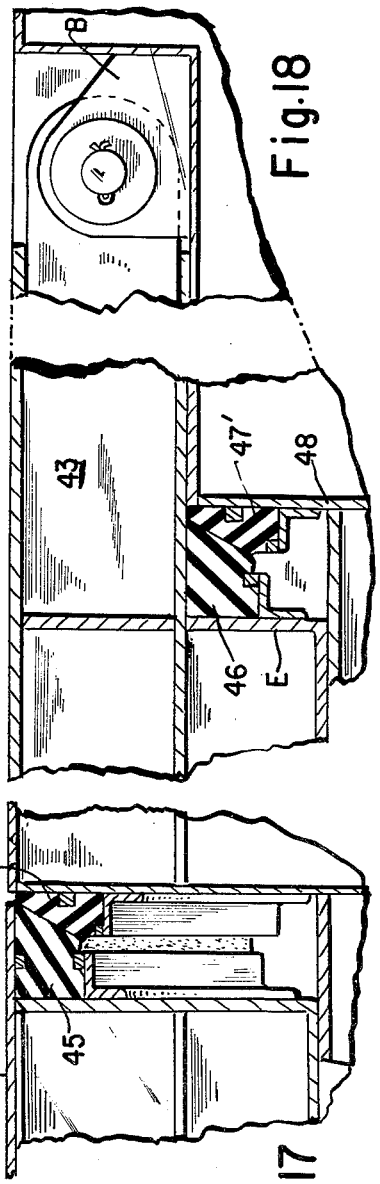
INVENTOR
GUSTAVE STRANSKY
BY
ATTORNEYS

INVENTOR
GUSTAVE STRANSKY
BY
ATTORNEYS

United States Patent Office 3,045,631
Patented July 24, 1962

3,045,631
WATER-TIGHT FLUSH HATCH COVER
CONSTRUCTIONS
Gustave Stransky, New York, N.Y.; Marianne Hecht, executrix of the estate of Gustave Stransky, deceased, assignor to MacGregor A.G., Basel, Switzerland, a corporation of Switzerland
Filed Dec. 14, 1959, Ser. No. 859,382
6 Claims. (Cl. 114—201)

The present invention relates to the art of hatch cover constructions.

More particularly, this invention relates to improvements in water-tight flush hatch cover constructions.

Various flush hatch cover constructions are known in the art, including the relationships disclosed in my prior Patent 2,869,501 dated January 20, 1959, and entitled "Water-Tight Hatch Cover," and my prior application Serial No. 449,368 filed August 12, 1954, now Patent No. 2,917,017, dated December 15, 1954 and entitled "Hatch Cover Arrangements." Generally, flush type hatch covers of the folding type have the hinge arms for the sections that are adjacent the ends of the hatch opening mounted on the deck and connected to the top of the adjacent hatch cover sections. Various proposals have been advanced in which the hinge arms are recessed in openings provided in the deck. When a flush hatch cover construction includes hinge arms recessed in the deck, the peripheral seal for the hatch opening should include provisions for sealing the space between the vertical wall at the end of the opening and the adjacent end wall of the cover section.

Accordingly, the present invention has for an object to provide a hatch cover construction including a plurality of cover sections associated with a hatch opening that is defined by vertical wall means and in which the tops of the sections are flush with the top of the opening when the sections are closed, and in which the seal between the sections and the opening and between the respective sections is adjacent the top of the sections and includes components for sealing the space traversed by the hinge arms which are recessed in the deck or lie below the top of the opening.

It is a specific object of the invention to provide a hinge seal in a flush, water-tight hatch cover arrangement which includes cooperable sealing components carried respectively by the end walls of the end sections and the vertical walls at the ends of the opening and which components surround the notches or recesses cut in such vertical walls for accommodating the hinge arms.

It is a more specific object to provide a hatch cover arrangement including a plurality of cover sections, with the opposite end sections being hinged relative to the opposite ends of the hatch opening and in which the hinge arms carried by such opposite end cover sections are accommodated in recesses extending below the level of the top of the opening and in which the peripheral seal includes sealing components that extend completely across the ends of the respective cover sections and which are shaped to conform substantially to the shape of the notches or recesses formed in the vertical walls at the ends of the opening.

It is a further and more specific object of the invention to provide a hatch cover arrangement including a plurality of pairs of cover sections mounted for folding movement relative to the opening and which arrangement includes gasket means carried by the periphery of the side walls of the cover sections immediately subjacent the tops thereof, a cooperating compression bar means carried by the wall means that delimits the opening, said gasket means and compression bar means being shaped to outline the open ends of each notch accommodating each hinge arm at the ends of the opening, and between the end walls of the respective sections that are adjacent to one another when the sections are closed, a gasket to gasket transverse seal.

As a further development of the invention, the peripheral seal can include gasket stripping carried by the cover sections and instead of compression bar means a cooperating gasket stripping is mounted on the vertical walls that delimit the opening.

It is a further specific object of the invention to provide a hatch cover relationship in which the hinge arms are accommodated in recesses in the deck at the opposite ends of the opening and in which the peripheral seal between the cover sections and the opening includes components that seal the periphery of the recesses that accommodate the hinge arms.

Figure 2:
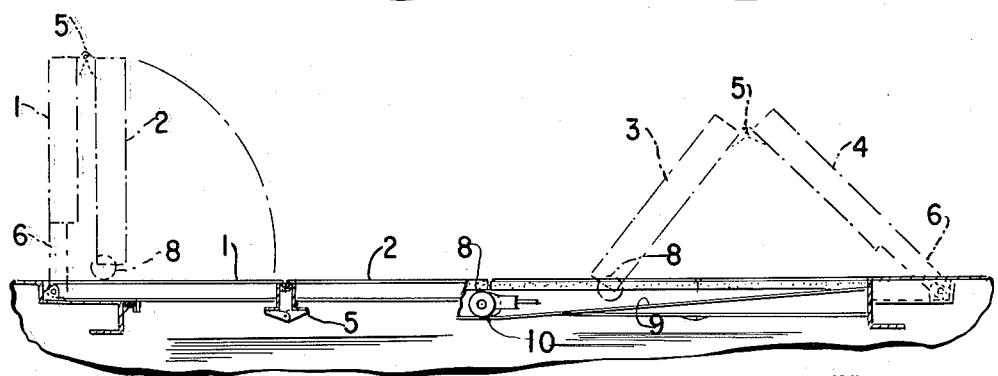
Figure 7:
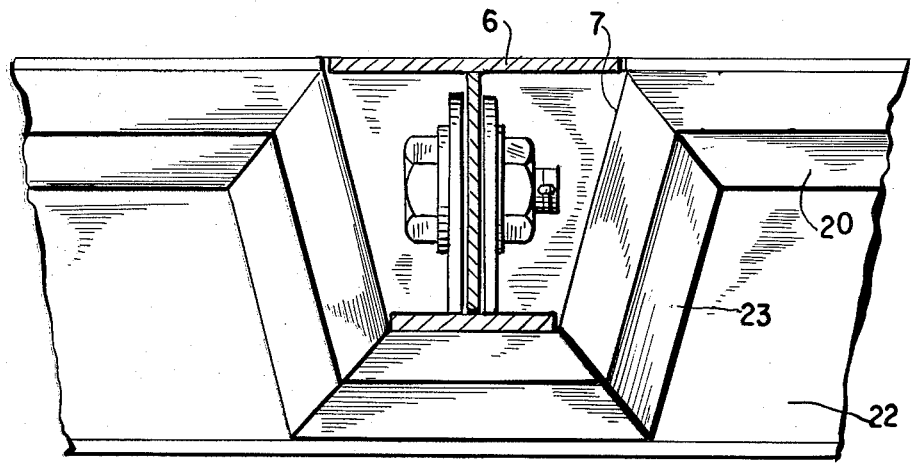
Figure 8:
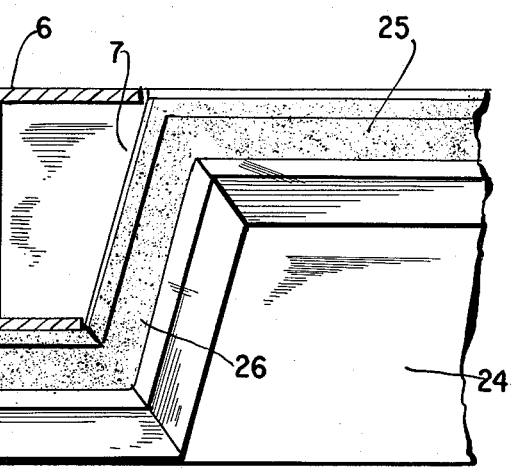

Further and more specific objects will be apparent from the following description taken in connection with the accompanying drawings, in which:

FIGURE 1 is a top plan view of one form of a flush hatch cover arrangement including two pairs of hingedly interconnected cover sections mounted for folding movement relative to the opening and in which the sections adjacent opposite ends of the opening carry hinge arms disposed in recesses in the deck, FIGURE 2 is a vertical cross-sectional view taken on line 2—2 of FIGURE 1 and also illustrating in dotted lines one pair of cover sections in open condition and the other pair in an intermediate position between opened and closed positions, FIGURE 3 is a fragmentary top plan view on an enlarged scale illustrating one form of seal around a hinge arm accommodated in a recess in the deck, FIGURE 4 is a vertical cross-sectional view taken along line 4—4 of FIGURE 3, FIGURE 5 is a vertical cross-sectional view taken along the plane of line 5—5 of FIGURE 3 to one side of a notch or recess that accommodates a hinge arm, FIGURE 6 is a view partly in vertical cross-section and partly in elevation taken along the plane of line 6—6 of FIGURE 3 at the side of one of the hinge arms and illustrating the sealing relationship between the cover and the portion of the end wall of the opening that is beneath the notch that accommodates the hinge arms, FIGURE 7 is a fragmentary view on an enlarged scale and partly in vertical cross-section taken along the plane of line 7—7 of FIGURE 3 showing the compression bar outlining a notch that accommodates a hinge arm, FIGURE 8 is a similar view taken along the plane of line 8—8 of FIGURE 3 but illustrating the gasket stripping carried by the end wall of a cover for cooperation with the compression bar shown in FIGURE 7, FIGURE 9 is a fragmentary cross-sectional view on an enlarged scale taken along line 9—9 of FIGURE 1 and illustrating a transverse joint between a pair of cover sections.

Figure 19:
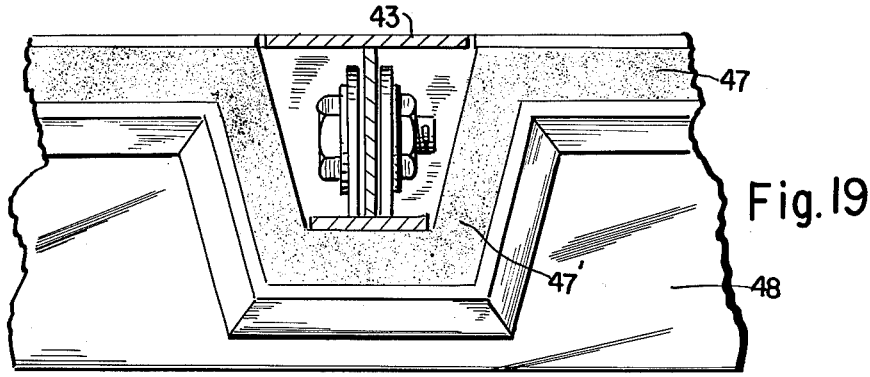
Figure 20:
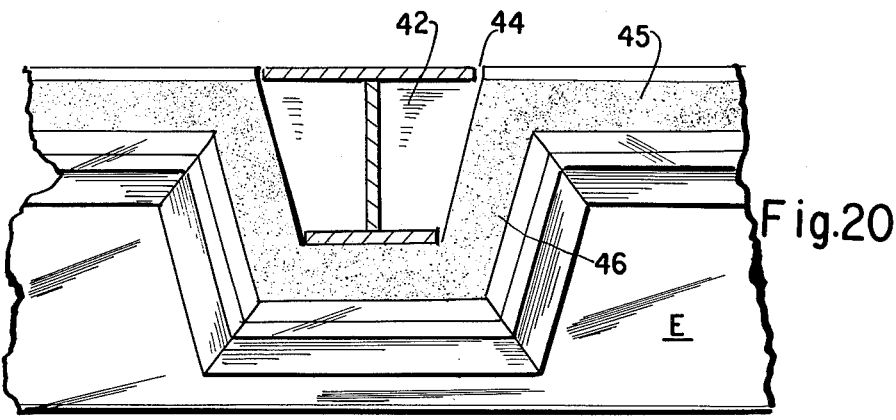

FIGURE 10 is a similar view but illustrating a modified form of transverse joint, FIGURE 11 is a fragmentary cross-sectional view on an enlarged scale taken along line 11—11 of FIGURE 1, and illustrating one form of peripheral seal, FIGURE 12 is a view similar to FIGURE 11 but illustrating a modified peripheral seal, FIGURES 13 and 14 are fragmentary views illustrating two forms of joints between the peripheral gaskets of adjacent cover sections, FIGURE 15 is a fragmentary view partly broken away and illustrating the corners of a pair of adjacent sections as seen from above, FIGURE 16 is a view similar to FIGURE 3 but illustrating a modified seal arrangement around a hinge arm and including gasket stripping carried by the cover section and cooperating gasket stripping outlining the notch at the end of the opening, FIGURE 17 is a view taken along the plane of line 17—17 of FIGURE 16 similar to FIGURE 5 but related to the form disclosed in FIGURE 16, FIGURE 18 is a view taken along the plane of line 18—18 of FIGURE 16 similar to FIGURE 6 illustrating the gasket to gasket sealing arrangement beneath the hinge arm of FIGURE 16, FIGURES 19 and 20 are views respectively taken along the planes of lines 19—19 and 20—20 of FIGURE 16 and respectively similar to FIGURES 7 and 8 but illustrating the seal relationship shown in FIGURE 16, and FIGURES 21, 22 and 23 are views similar to FIGURE 12 but illustrating modified forms of supporting means for the gasket stripping carried by the wall means that delimits the hatch opening.

In the drawing, the hatch cover arrangement is illustrated as being of the type including two pairs of hingedly interconnected and oppositely moving cover sections which fold about horizontal axes at the ends of the opening into open position. The invention is not to be limited to this precise relationship since it is equally applicable to an arrangement where only one section is pivoted relative to each end of the opening or one in which more than two pairs of sections are involved, in that additional sections, either individual ones or additional pairs are associated with the middle portion of a hatch opening of large size. In any event, the invention is directed to a flush cover relationship in which the tops of the sections lie flush with the top of the opening and in which the hinge arms are accommodated in recesses in the deck and the sealing relationship as far as the periphery of the opening is concerned is continuous in that each recess in the deck or each notch in the end walls that delimit the ends of the opening is sealed.

Thus, FIGURE 1 illustrates a form of the invention in which two pairs of cover sections are associated with a hatch opening. Cover sections 1 and 2 are hinged together by hinge means 5 and carry hinge arms shown diagrammatically at 6 accommodated in recesses 7 and hinged within said recesses so that this pair of cover sections can move to vertical folded position as shown in FIGURE 2. The other pair of cover sections 3 and 4 are likewise hinged together by hinges such as 5 and carry hinge arm 6 hinged in recesses 7 at the other end of the opening. Cover sections 2 and 3 carry wheels shown diagrammatically at 8 which, in the illustrated form, ride on tracks 9 that extend upwards from a supporting ledge 10 so that when the covers are moved to open position the wheels on cover sections 2 and 3 roll up these tracks and across the angle-shaped compression bar, described hereinafter, to stowed position as shown in dotted lines in FIGURE 2. In this form of the invention, the transverse seal between cover sections 2 and 3 is of the type shown in FIGURE 9, and includes angle irons 11 carried by the end walls 12 and 13 that accommodate gasket strips 14 and 15, respectively, that extend transversely across the opening. These gasket strips, as shown in FIGURE 15, are connected with further gasket strips 16 and 17 that extend along the side walls 18 and 19 of cover sections 2 and 3. The gasket strips on the end wall of sections 1 and 4 make sealing engagement, as shown in FIGURE 11, with an angle-shaped compression bar 20, the free ends of which are welded to the vertical wall means 20 that delimit the sides of the opening. There is thus provided a gasket transverse seal and a gasket to metal peripheral seal. The transverse seal between cover sections 1 and 2 and cover sections 3 and 4 is the same structure as the seal between sections 2 and 3. The angle-shaped compression bar 20 extends completely along the wall means 21 that delimit the opposite sides of the opening and also an angle-shaped compression bar extends along the wall means 22 that delimits the opposite ends of the opening.

The recesses 7 at the opposite ends of the opening accommodate the hinge arm 6, FIGURE 3, each hinge arm being of I-beam configuration and fitting in the recessses 7. The angle-shaped compression bar 20 that extends along the ends of the opening includes substantially U-shaped portions 23, FIGURE 7, that outline the open ends of the recesses 7 in the wall 21 which accommodates the hinge arm, FIGURE 7. The gasket stripping carried by the cover sections 1 and 4 includes portions extending across the end walls of cover sections 1 and 2 that are adjacent the vertical walls 22 that delimit the ends of the opening. Thus, as shown in FIGURES 4 to 6, the end wall 24 of cover section 4 carries a gasket strip portion 25 that is at the same level as gasket strips 16 and 17 along the sides of the sections, and seals on the compresison bar 20. This gasket stripping 25, as shown in FIGURE 8, includes a substantially U-shaped portion 26 that outlines the opened end of the notch 7 and seals against the U-shaped portion 23 of the gasket stripping carried by the end wall 22 of the opening. FIGURES 5 and 6 clearly indicate the sealing relationship between the end wall 24 of cover section 4 and the periphery of the open end of one of the recesses 7 that accommodates the hinge arm 6. Thus, in this form of the invention, the peripheral seal around the opening is a gasket stripping carried by the side walls of each cover section and those end walls that the adjacent the ends of the opening that cooperates with an angle-shaped compression bar carried by the side walls 21 and end walls 22 that delimit the opening. This compression bar is shaped to outline each notch that accommodates a hinge arm and the gasket stripping carried by the end walls of the cover sections 1 and 4 is similarly shaped. There is thus provided a relationship which includes a gasket to gasket transverse seal between the cover sections of each pair and between the end sections of adjacent pairs and a gasket to compression bar seal around the periphery of the opening including portions that outline the end of the recesses that accommodate the hinge arms 6.

FIGURE 14 shows a modified form of joint between the gasket strippings that extend along the sides of adjacent sections, in that the stripping 16' and 17' have beveled ends as opposed to the vertical butt joint of FIGURE 13. With this relationship, the transverse joints between the sections will include beveled gasket stripping 14' and 15', FIGURE 10.

FIGURES 16 to 20 disclose a further form of the invention in which the seal at the opposite ends of the opening, while similar to the relationship of FIGURES 3 to 8, includes a gasket to gasket seal rather than a gasket to compression bar seal. Thus, cover section 42 corresponds to cover section 4 in FIGURE 1 and carries hinge arms 43, similar to hinge arms 6. These hinge arms are pivoted to brackets B and are accommodated in recesses 44 in the deck or top of the opening. The peripheral seal between the cover sections and the opening includes gasket stripping 45 that extends along the sides and ends of the cover sections, such as 42, as shown in FIGURE 12, that seals against gasket stripping 47 carried along the sides and ends of the opening. These gasket strips are beveled so that there is a beveled or angled sealing relation between the periphery of the cover sections and the periphery of the sides of the opening. The transverse joints between the respective sections are again a gasket to gasket seal and can be of either one of the seals shown in FIGURES 9 and 10, respectively. Along the end wall E of cover section 42 the gasket stripping 45 includes a shaped portion 46 that outlines the end of the recess 44. Cooperating with this shaped portion 46 is a similarly shaped gasket strip portion 47' carried by the wall 48 that delimits the end of the opening. It is believed clear that this gasket to gasket seal which outlines the end of the recess 44 functions similarly to the relationship in FIGURES 7 and 8, as readily apparent from FIGURES 19 and 20. This form of the invention, therefore, contemplates a complete peripheral seal of gasket to gasket relationship that extends along the sides and ends of the opening and around that portion of the hinge arm structure that extends across the space between the end walls of the end cover sections and the adjacent end walls of the opening.

In connection with the transverse seal of this application it is pointed out that the tops of the cover sections extend beyond the side walls of the sections, as shown in FIGURES 2 and 3 of my prior application Serial No. 449,368 (now Patent No. 2,917,017). The gasket stripping, such as 14 and 15, carired by the end walls of sections 2 and 3 and the mutually adjacent end walls of sections 1 and 2 and 3 and 4 includes opposite end portions that engage the projecting portions of the peripheral gasket stripping, as is believed clear from FIGURE 15. Thus, except where the seal components outline the open ends of the recesses, the seal means lie at the same level around the opening and across the same.

Figures 21, 22, 23:
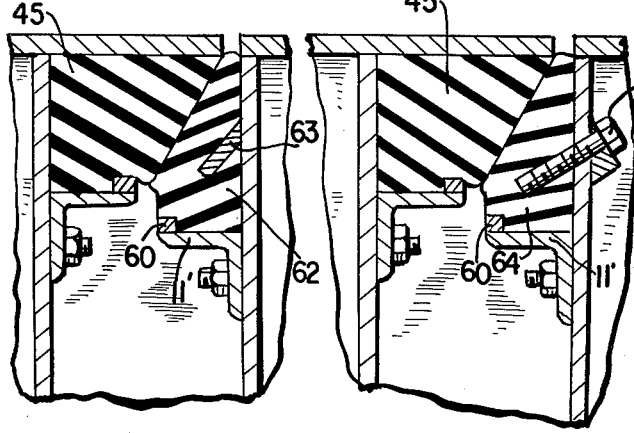

FIGURES 21 to 23 disclose a further feature of the invention in that the gasket stripping carried by the side and end walls that delimit the opening is associated with mounting means that cooperates with such stripping to provent it being pulled away from the walls. It occasionally happens in adverse weather that the gasket stripping carried by the cover section might adhere to the gasket stripping carried by the opening so that when the sections are moved to open position an upward force is exerted on the gasket stripping on the opening. To counteract this, the invention provides the angle brackets such as 11′, FIGURES 12 and 21 to 23, which has a bead 60 on the outer edge thereof. A further bead 61, FIGURE 12, is welded to the wall 48 and the other walls that delimit the opening. The gasket stripping is extruded and shaped to provide a groove to fit around the bead 61 and a notch to fit behind the bead 60. In order to provide more downward counteracting force on the stripping, the FIGURE 21 relationship discloses a gasket stripping 62 which is shaped to include a groove that will fit around a downwardly and inwardly extending rib 63.

In FIGURE 22, the gasket stripping 64 is mounted by a series of downwardly and inwardly extending screws 65. In FIGURE 23, the gasket stripping 66 is provided with a shaped groove which fits over an L-shaped rib 67 welded on the interior of the opening. In this arrangement the gasket stripping is slid over this rib and then pushed upwards when the angle shaped retainer 11′ is secured in place.

Thus, in this development of the invention, the gasket stripping carried by the side and end walls of the cover sections is associated with retaining means capable of applying a downward force on such stripping to resist any upward pull that may be applied to the stripping if it had a tendency to freeze or adhere to the gasket stripping carried by the cover sections. This retaining means can be either the horizontally disposed rib 61 of FIGURE 12 or the various retainers 63, 65 and 67 shown in FIGURES 21 to 23.

The ribs 61, 63 and 67 may either be continuous around the opening or of sections of sufficient length to provide proper force, in which event the gasket stripping is either continuous or in lengths commensurate with the length of the ribs. Draining means, not shown, can be associated with that portion of the hinge arm accommodating recesses that are outboard of the peripheral seal.

Also, suitable dogging means, not shown, are provided adjacent the center joint around the periphery of the opening. These dogging means can be as described in my said prior application or of any other suitable type.

It is further to be pointed out that a cushion strip, not shown, could be disposed between the upper surface of the supporting ledge and the under surface of the side walls of the cover sections. This cushion could be attached to either the ledge or to the bottom of the cover sections.

The invention also contemplates a peripheral seal in which the cooperating sealing components located adjacent the hinge arms, instead of outlining the open end of the recesses that accommodate the hinge arms, includes portions that outline the top of the recess. In other words, gasket stripping extends along the end wall of each cover section and then along the under surface of the top of each hinge arm. Cooperating sealing means, either an angle bar or rubber gasket, extends along the side walls of each recess to a point adjacent the plane of the pivot axis. The end of this stationary seal means is suitably shaped to permit the swinging movement of the hinge arm. The gasket stripping carried beneath the top of the hinge arm fits beneath an extended upper surface of the top plating of the area surrounding the recess so that along a portion of the sides of each recess and the back end of the recess there is a seal against this extended plating that is applied from beneath this plating from the plane of the pivot point outwards, whereas the seal from the plane of the pivot point toward the cover section is between the gasket stripping carried by the hinge arm and stationary seal means carried by the side walls of the recess.

What is claimed is:

1. In a flush, water-tight hatch cover construction, vertical side and end wall means defining a hatch opening, a plurality of hatch cover sections for closing and exposing the opening, each cover section having top, side and end walls, the tops of the sections being flush with the top of the opening, hinge arms carried by the end walls of those sections that are adjacent the opposite ends of the opening, the end wall means of the opening having recesses for accommodating said hinge arms, said recesses having an open end adjacent the respective end cover sections, and pivot means for said hinge arms mounted outwards of said end wall means, transverse gasket stripping carried by the end walls of each section to provide a transverse seal between the respective sections and an end seal at each end of the opening, peripheral gasket stripping carried by the side walls of each section, cooperating sealing means carried by the side and end wall means that defines the opening, and the gasket stripping carried by the end walls of the end sections and the cooperating sealing means carried by the end walls of the opening including shaped portions outlining the open end of each recess and surrounding each hinge arm, and in which all of the gasket stripping and cooperating sealing means except such shaped portions lie at the same level at the upper end of the opening.

2. A flush, water-tight hatch cover construction as claimed in claim 1, in which said cooperating sealing means is an angle bar, the free ends of which are secured to the side and end wall means that delimits the opening.

3. A flush, water-tight hatch cover construction as claimed in claim 1, in which said cooperating sealing means is gasket stripping whereby all of the seals between the respective sections and between the ends and sides of the sections and the side and end walls delimiting the opening are gasket to gasket seals.

4. A flush, water-tight hatch cover construction as claimed in claim 4, and gasket stripping retaining means carried by the side and end wall means that delimits the opening for cooperation with the related gasket stripping to prevent upward movement thereof.

5. In a water-tight, flush hatch cover construction, the combination including vertical side and end wall means delimiting a hatch opening, a plurality of pairs of cover sections for closing and exposing the opening, each pair of sections being hinged together, hinge arm means carried by that section of each pair that is adjacent an end of the opening, the end wall means of the opening having recesses for accommodating said hinge arm means, said recesses having an open end adjacent the respective end cover sections, means pivoting the respective hinge arms relative to the opening so that a jackknifing cover relationship is provided, gasket stripping carried by the end wall of each section that is adjacent the end wall of another section immediately subjacent the tops of the respective sections, whereby a transverse seal between the respective sections of each pair of sections and between the innermost sections of adjacent pairs of sections results, gasket stripping carried by the end walls of those sections that are adjacent opposite ends of the opening, ledge means extending inwardly from at least the opposite sides of the opening for supporting the sides of the sections, a peripheral seal between the opening and the sides of the sections and the end walls of the end sections including a sealing component carried by the sides and ends of the opening and having shaped portions outlining the open ends of said recesses, gasket stripping carried by the sides of the sections and the end walls of those sections adjacent the ends of the opening including portions shaped to outline the recesses whereby a complete peripheral seal for the opening results, the gasket stripping and cooperating sealing component carried by the sides of the sections and the sides of the opening and the gasket stripping and cooperating sealing component carried by the end walls of those sections adjacent the ends of the opening and carried by the ends of the opening except the portion shaped to outline the recesses also being disposed immediately subjacent of the tops of the sections and at the upper end of the opening respectively, wheel means for the inner cover of each pair, and track means between the side walls of the sections and the side wall means of the opening permitting cover opening movement.

6. A water-tight, flush hatch cover construction as claimed in claim 5, and rubber cushion means between the sides of the sections and said ledge means.

References Cited in the file of this patent
UNITED STATES PATENTS
2,707,928    Farrell _____ May 10, 1955

UNITED STATES PATENT OFFICE
CERTIFICATE OF CORRECTION

Patent No. 3,045,631             July 24, 1962

Gustave Stransky

It is hereby certified that error appears in the above numbered patent requiring correction and that the said Letters Patent should read as corrected below.

Column 1, line 20, for "1954" read -- 1959 --; column 3, line 66, for "20" read -- 22 --; column 4, lines 3 and 4, for "recessses" read -- recesses --; line 16, for "comprésison" read -- compression --; line 27, for "that the" read -- that are --; column 5, line 23, for "cooperates" read -- cooperate --; column 6, line 63, for the claim reference numeral "4" read -- 1 --.

Signed and sealed this 19th day of February 1963.

(SEAL)
Attest:

ESTON G. JOHNSON
Attesting Officer

DAVID L. LADD
Commissioner of Patents